Figures 1, 2:
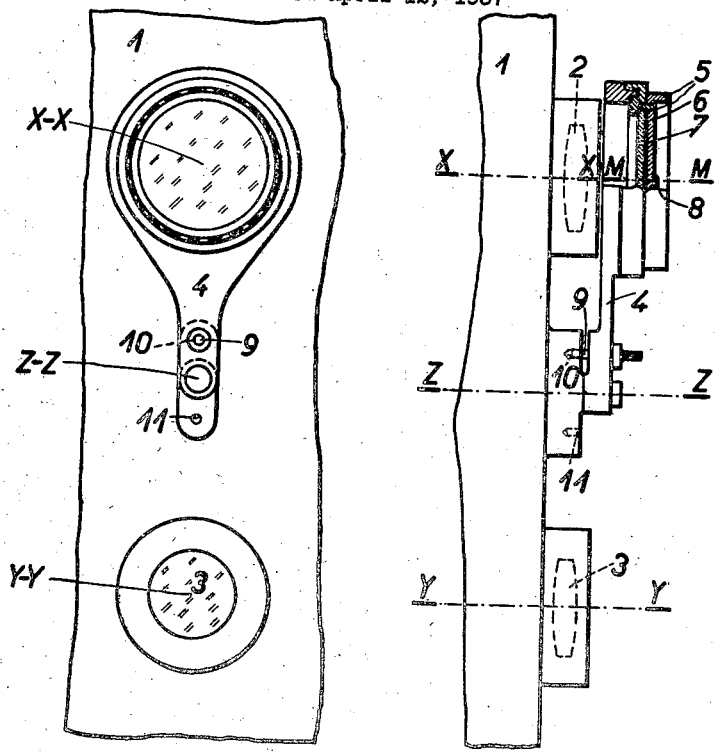

July 19, 1938.  M. BURCKHARDT  2,124,286

POLARIZATION DEVICE FOR CAMERAS HAVING A LINEARLY POLARIZING FOIL

Filed April 12, 1937

Inventor:

Max Burckhardt

Patented July 19, 1938

2,124,286

UNITED STATES PATENT OFFICE 2,124,286

POLARIZATION DEVICE FOR CAMERAS HAVING A LINEARLY POLARIZING FOIL

Max Burckhardt, Jena, Germany, assignor to the firm Carl Zeiss, Jena, Germany

Application April 12, 1937, Serial No. 136,363
In Germany April 25, 1936

1 Claim. (Cl. 95—64)

I have filed an application in Germany April 25, 1936.

The invention concerns a polarization device which is provided with a linearly polarizing foil, for instance of herapathite, and can be used with cameras having a finder.

When the object to be photographed by means of a camera of the said kind is being sought, the foil is to be given such a position as to influence the rays which image the object in the eye, subsequently whereto the foil is to be rotated in its plane until its direction of oscillation provides the most favourable effect of the foil on the image presented to the eye, and, finally, the foil is to be so placed on the object side of the objective of the camera that the direction of oscillation of the foil coincides with the direction obtained in finding the object.

According to the invention, the foil is held by a carrier which is movably so disposed on the camera, or on a base easily detachable from the camera, that it can assume two positions for use in which the foil is coordinated to the camera objective and to the finder, respectively, in such a manner that its direction of oscillation is the same in both the said positions, the mount of the foil being disposed on the said carrier in such a way as to be rotatable about an axis at right angles to the foil, so as to adjust the direction of oscillation of the foil.

The carrier can be mounted on the camera for instance in such a manner as to be rotatable about an axis which is parallel to the axis of the camera objective and so disposed that conveying the carrier from the one position for use to the other can be effected by rotating this carrier through an angle of 180°.

In the accompanying drawing, which illustrates a constructional example of a device according to the invention, Figure 1 is a front and Figure 2 a side view of this example, some of the parts in Figure 2 being shown in section.

In Figures 1 and 2, I designates the housing of a camera which has an objective 2 for the finder and an objective 3 for photographic purposes. The axis X—X of the finder objective 2 is parallel to and above the axis Y—Y of the photographic objective 3. On the housing I is mounted an arm 4 rotatable about an axis Z—Z which lies in the plane of, and is parallel to and equidistant from, the two objective axes X—X and Y—Y. On the arm 4, a body 5 is mounted for rotation about an axis M—M which is parallel to the axis of rotation Z—Z and has a distance from the axis of rotation Z—Z equal to the distance of the two objective axes X—X and Y—Y from the axis Z—Z. The body 5 is the mount of a herapathite foil 8 cemented between two cover glasses 6 and 7 and at right angles to the axis of rotation M—M. By rotation about the axis Z—Z, through an angle of 180°, the arm 4 can be given two positions for use. In the position for use represented in the drawing, the axis M—M coincides with the axis X—X of the finder objective 2. In the other position for use, the axis M—M coincides with the axis Y—Y of the photographic objective 3. In the said two positions, the arm 4 is held by an elastic pin 9 extending respectively into an aperture 10 and an aperture 11.

Using the device is very simple: When the arm 4 is in that position for use in which the foil 8 is coordinated to the finder objective 2, the mount 5 of the foil 8 is to be rotated relatively to the arm 4 about the axis M—M until the person viewing through the finder perceives that the foil 8 produces the most favourable effect upon the image presented to the eye. Subsequently thereto, by rotation relative to the camera housing I through 180° about the axis Z—Z, the arm 4 is made to assume its other position for use, in which the foil 8 is coordinated to the photographic objective 3. The previously adjusted direction of oscillation of the foil 8 being maintained, the effect of the foil 8 is as favourable when a photograph is taken as it had been in finding the object.

Instead of the finder camera shown in the drawing, any other known finder (for instance a telescopic finder, a brilliant finder or a diopter) can be attached to the camera housing, regardless of what is the position of the front element of the finder, it being easily possible in any case to provide a polarization device according to the invention.

I claim:

In a camera having a finder the viewing axis of which is parallel to the axis of the camera objective, an arm, a transparent linearly polarizing foil mounted on said arm for rotation about an axis at right angles to said foil, said arm being mounted on the camera for rotation about an axis parallel to first said axis of rotation and to the axis of the camera objective, the axis of rotation of said arm lying in the plane containing the axis of the camera objective and the viewing axis of the finder and being equidistant from these two axes, the length of said arm being such that the polarizing foil may overlie the camera objective or the finder.

MAX BURCKHARDT.